(12) United States Patent
Chen

(10) Patent No.: US 12,419,230 B1
(45) Date of Patent: Sep. 23, 2025

(54) POROUS CERAMIC MEMBER WITH NANO SILVER COATING FOR FILTERING A PLANT GROWTH MEDIUM AND METHOD OF APPLICATION

(71) Applicant: Orchid Gene, LLC, Morrisville, NC (US)

(72) Inventor: Hsi-Chuan Chen, Morrisville, NC (US)

(*) Notice: Subject to any disclaimer, the term of this patent is extended or adjusted under 35 U.S.C. 154(b) by 517 days.

(21) Appl. No.: 17/070,800

(22) Filed: Oct. 14, 2020

Related U.S. Application Data

(60) Provisional application No. 62/914,964, filed on Oct. 14, 2019.

(51) Int. Cl.
*A01G 24/40* (2018.01)

(52) U.S. Cl.
CPC ................... *A01G 24/40* (2018.02)

(58) Field of Classification Search
CPC ........ A01G 24/40; A01G 24/42; A01G 24/44; A01G 24/46; A01G 24/48
USPC .............................................................. 47/46
See application file for complete search history.

(56) References Cited

U.S. PATENT DOCUMENTS

| | | | | |
|---|---|---|---|---|
| 2,084,005 | A | * | 6/1937 | Richards ................ A01G 27/06 239/DIG. 15 |
| 2006/0175256 | A1 | * | 8/2006 | Masten ................ B01D 71/024 427/245 |
| 2010/0176044 | A1 | * | 7/2010 | Domb .................... B01J 20/103 210/287 |
| 2013/0174483 | A1 | * | 7/2013 | Caspar ................. A01G 9/0293 47/65.7 |
| 2015/0001157 | A1 | * | 1/2015 | Johnson .................... C02F 1/42 210/688 |
| 2015/0007496 | A1 | * | 1/2015 | Lewis ...................... A01G 9/18 47/58.1 R |
| 2015/0027050 | A1 | * | 1/2015 | Cave ...................... A01G 31/00 424/490 |
| 2015/0299060 | A1 | * | 10/2015 | Okuya .................... C05G 3/00 71/12 |

(Continued)

FOREIGN PATENT DOCUMENTS

| | | | |
|---|---|---|---|
| DE | 202018102722 U1 | * | 7/2018 |
| JP | H09157062 A | * | 6/1997 |
| JP | H11103702 A | * | 4/1999 |

(Continued)

OTHER PUBLICATIONS

Yakub, I., Soboyejo, W. O. "Adhesion of *E. coli* to silver- or copper-coated porous clay ceramic surfaces." J. Appl. Phys. Jun. 15, 2012; 111 (12): 124324. https://doi.org/10.1063/1.4722326 (Year: 2012).*

*Primary Examiner* — Peter M Poon
*Assistant Examiner* — Hae Rie Jessica Byun
(74) *Attorney, Agent, or Firm* — Michael D. Eisenberg

(57) ABSTRACT

The systems and methods herein are directed to a porous ceramic material coated with nano particles, thereby achieving a filtration and absorption environment for a plant growth medium. The plant growth medium is released in a non-toxic state for consumption by plants residing within the porous ceramic material coated with nano particles. The pores are arranged as to store and subsequently release the plant growth medium in a non-toxic state, which is consumed by the one or more plants. The plants are consuming healthier plant growth medium, and thereby grow to be taller and healthier.

4 Claims, 2 Drawing Sheets

(56) References Cited

U.S. PATENT DOCUMENTS

2018/0343806 A1* 12/2018 Leo ...................... A01G 9/0297
2021/0045299 A1* 2/2021 Ranno ..................... C05F 11/02

FOREIGN PATENT DOCUMENTS

| JP | 2015029930 A | * | 2/2015 | |
|----|--------------|---|--------|---|
| KR | 200370337 Y1 | * | 12/2004 | .............. A01G 1/00 |
| KR | 200378758 Y1 | * | 3/2005 | |
| KR | 20060094238 A | * | 8/2006 | ........... A01G 31/001 |
| KR | 20110016063 A | * | 2/2011 | |
| KR | 2018000083 A | * | 1/2018 | ........... A01G 31/001 |
| WO | WO-2005094561 A1 | * | 10/2005 | ............. A01G 27/04 |
| WO | WO-2013162163 A1 | * | 10/2013 | ............... A01G 1/00 |

* cited by examiner

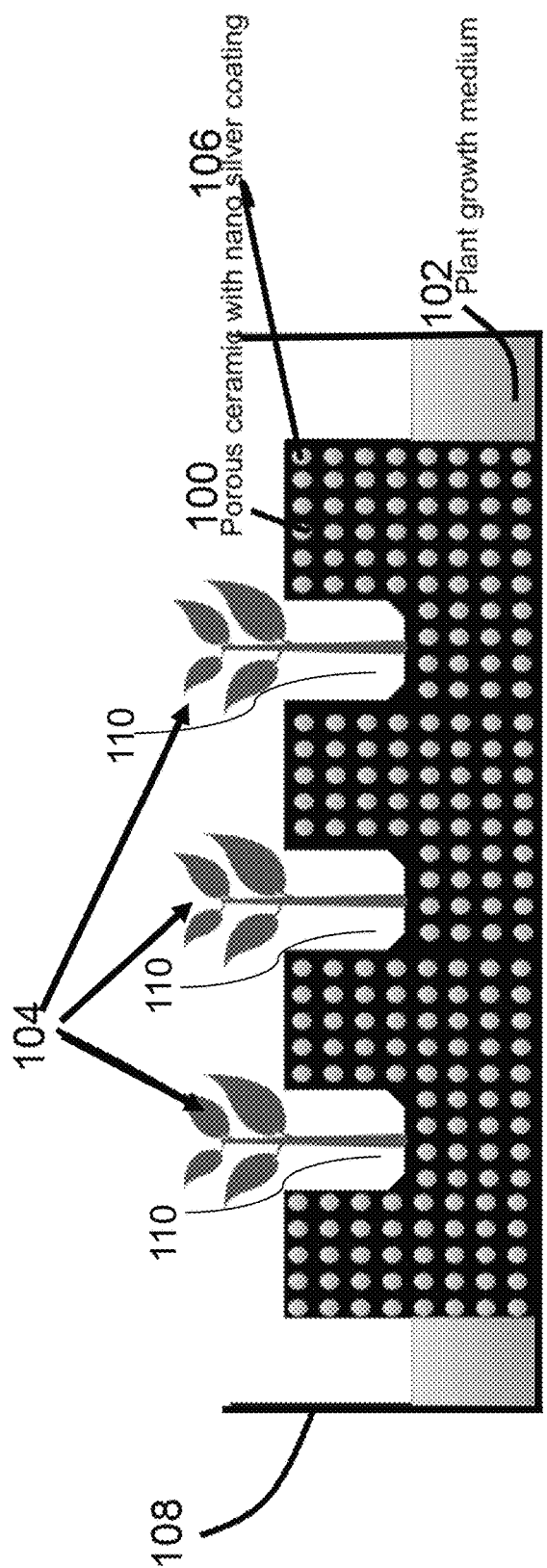
Fig. 1
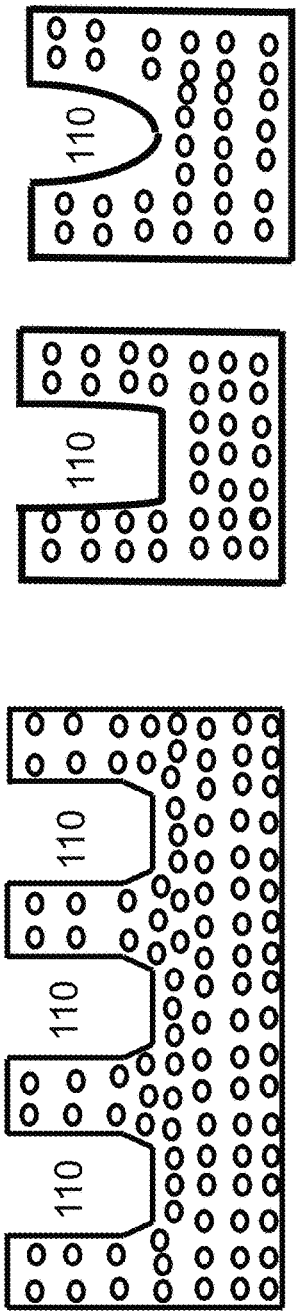
Fig. 2
Fig. 3
Fig. 4

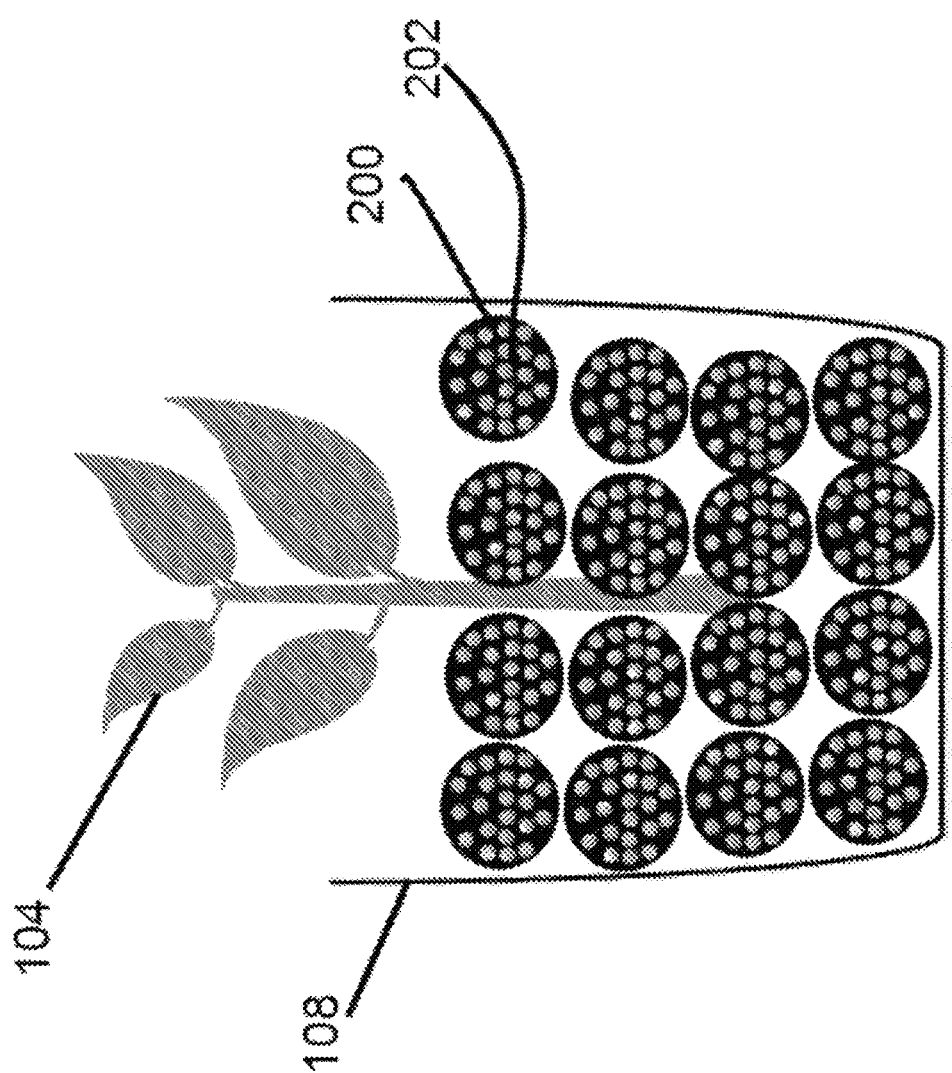

POROUS CERAMIC MEMBER WITH NANO SILVER COATING FOR FILTERING A PLANT GROWTH MEDIUM AND METHOD OF APPLICATION

CROSS-REFERENCE TO RELATED APPLICATIONS

This application claims priority to U.S. Provisional Patent Application No. 62/914,964 entitled "Porous Ceramic Member with Nano Silver Coating for Filtering a Plant Growth Medium and Method of Application", filed on Oct. 14, 2019, which is incorporated in its entirety.

FIELD OF INVENTION

The invention herein us directed to plant science, and more specifically enhancing plant growth via ceramic and nanoparticle-based systems.

BACKGROUND OF THE INVENTION

Typically, growth media, which can include artificial soil and naturally occurring soil, are used in the horticultural and agricultural industries to grow plants in farm factories, hydroponic farms, green houses, and green urban areas. Such plant growth significantly contributes to by imparting the following environment benefits: (i) cleaning of the atmosphere; (ii) relaxing heat island phenomenon; and (iii) lowering carbon dioxide levels in areas in which such plant growth occurs. The environment benefits allow for a living environment to be comfortable.

It is also known in the agricultural field that bacteria are living organisms often composed of a single cell in the form of straight or curved rods (bacilli), spheres (cocci), or spiral structures. Their chemical composition is primarily of sequences of amino acids (i.e., proteins) and sequences of nucleotides (i.e., nucleic acids). Bacteria can be classified by particle sizes in the range of about 0.2 to 2.0 microns. Often, such microbes (e.g., algae, bacteria, and mold) and other chemicals (such as heavy metals, organic chemical contaminants, and inorganic chemical contaminants) pose a contamination problem in plant tissue horticulture and general horticultural activities. The contamination problem can decompose plants or lead to the uptake of toxic materials in the plants (e.g., absorption of heavy metals, such as lead).

Typically, filtration applications, including bacteria removal, involve filtering water or plant growth medium through a sieve or porous surfaces. Filtering applications can also include: (i) a film layer which sets up in cross-flow ultrafiltration or (ii) polymeric membranes. These sieves, porous surfaces, film layers, and polymeric membranes are susceptible to slime buildup and often are limited in their method of cleanup. Thus, these filtering applications have decreased effectiveness in the remediation of the contamination problem.

What is needed is a system or method which remove such bacteria. along with chemicals (e.g., heavy metal, organic contaminants, and inorganic contaminants) from the plant growth medium.

SUMMARY OF THE INVENTION

In a variant, a plant containment unit comprises: a porous ceramic material disposed within the plant containment unit, wherein the porous ceramic material is configured to receive one or more plants; a coating disposed on the porous ceramic material, wherein the coating comprises silver, magnesium, and carbon; a growth medium disposed within the plant containment unit; wherein the coating and the porous ceramic material are configured to absorb the growth medium and filter the growth medium, and thereby release the growth medium in a non-toxic state; and wherein the porous ceramic material comprises a plurality of pores configured in a uniform distribution or a non-uniform distribution.

In another variant, the plurality of pores is disposed on a plurality of ceramic beads.

In yet another variant, the plurality of pores is disposed on a ceramic member.

In still another variant, the growth medium in a non-toxic state is enriched in growth inducing content.

In still yet another variant, the porous ceramic material is constructed of at least one of: silicon (Si), zirconium oxide ($ZrO_2$), and aluminum oxide ($Al_2O_3$)

In still yet another variant, the coating is a nanoparticle present in an amount between 20 ppm-200 ppm.

In still yet another variant, the growth inducing content comprises nitrogen, phosphorous, potassium, calcium, magnesium, and sulfur.

In still yet another variant, the growth medium comprises: aqueous growth liquid, deionized water, nutritional formula, mineralized water, water with plant fertilizer, MS medium, and woody plant medium.

In still yet another variant, the plurality of pores comprises pores each ranging from 0.22 micrometers to 0.50 micrometers.

In still yet another variant, the plurality of pores comprises pores each ranging between 0.20 micrometers to 1.00 micrometer.

In still yet another variant, the coating is silver sized between 5-40 nanometers.

In still yet another variant, the plurality of ceramic beads is arranged as to provide enhanced room for root systems of the one or more plants.

In still yet another variant, the growth medium in a non-toxic state is absent of microbes, wherein the microbes comprise algae, bacteria, and mold.

In a variant, a method of growing plants comprises: coating porous ceramic material with nanoparticles; placing the porous ceramic materials coated with nanoparticles into a plant containment unit; placing the plant growth medium into the plant containment unit, thereby the plant growth medium contacts the porous ceramic materials coated with nanoparticles; placing one or more plants into the plant containment unit, thereby the plant containment unit comprises plant growth medium and the porous ceramic material coated with nanoparticles; absorbing the plant growth medium into pores of the porous ceramic material coated with nanoparticles; filtering the plant growth medium through the porous ceramic material coated with nanoparticles, thereby removing contaminants from the plant growth medium and enriching the plant growth medium with growth inducing content; releasing the plant growth medium enriched with the growth inducing content from the pores, thereby contacting root systems of the one or more plants; and wherein the nanoparticles comprise silver, magnesium, and carbon.

In another variant, the one or more plants grow healthier in the plant growth medium enriched with the growth inducing content than in the plant growth medium prior to filtering the plant growth medium through the porous ceramic material coated with nanoparticles.

In yet another variant, porous ceramic material is a plurality of ceramic beads or a ceramic member.

In still yet another variant, the plurality of ceramic beads functions as soil.

In still yet another variant, the ceramic member functional as a traditional gel, wherein the traditional gel comprises agar, gelatin, and phytagel.

In still yet another variant, the porous ceramic material is constructed of at least one of: silicon (Si), zirconium oxide ($ZrO_2$), and aluminum oxide ($Al_2O_3$)

In still yet another variant, the plurality of ceramic beads provides enhanced room for the root systems of the one or more plants.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1 is a perspective illustration of an embodiment of applying a porous ceramic member with nano silver coating for filtering a plant growth medium in a plant tray or field, in accordance with an embodiment of the present invention.

FIG. 2, FIG. 3, and FIG. 4 are depictions of the immediate plant growing region of a porous ceramic member with nano silver coating for filtering a plant growth medium in a plant tray or field, in accordance with an embodiment of the present invention.

FIG. 5 is a perspective illustration of an embodiment of applying bead-shaped members of the porous ceramic member with nano silver coating for filtering a plant growth medium in a plant pot, in accordance with an embodiment of the present invention.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

The present invention is directed toward porous ceramic systems (inorganic, heat-resistant, nonmetallic solids composed of metallic and nonmetallic compounds) coated with nanosized silver particles (i.e., a particle which has at least one dimension below 100 nanometers (nm)) and the use thereof. A plant containment unit of the systems and methods herein are constructed of the porous ceramic systems herein coated with nanosized silver particles have macroscale and nanoscale properties, thereby: (1) portions of the ceramic structure are brittle and rigid, which break upon sufficient impact; and (2) portions of the ceramic structure are (a) revertible such that a maximum compression of 1 micron from a thickness of 50 nm does not lead to structural damage and (b) light, flexible, and durable.

The porous ceramic systems herein coated with nanosized silver particles are chemically and physically acting upon the contaminants (i.e., chemical and physical remediation of the growth media). Nano silver can strongly inhibit the growth of microbes by breakdown their cell structure. More specifically, porous ceramic member 100 is coated with nano silver 106. Thereby, a ceramic-nanoparticle environment, which has macroscale and nanoscale properties, can filter plant growth medium 102 and thus sequestering growth hindering contents from plant growth medium 102 in the pores (a physical form of remediation of plant growth medium 102) and/or catalyzing degradation of chemicals and microbes by the nano silver (i.e., a chemical form of remediation of plant growth medium 102). Thereby, plant growth medium 102 in plant containment unit 108 is enriched with growth inducing contents (e.g., nitrogen, phosphorous, potassium, calcium, magnesium, and sulfur) which contact plants 104 within plant contain unit 108. Plants 104 are thus consuming plant growth medium 102 enriched with growth inducing contents, while reducing or eliminating the consumption of growth hindering contents.

Physical and chemical remediation of the growth media is achieved by the porous ceramic member 100 coated with nano silver 106 that serves as a micro filter, which substantially or completely removes heavy metal, organic, and inorganic chemicals (i.e., impurities which are growth hindering contents) from a plant growth medium 102. Stated another way, the porous ceramic member 100 coated with nano silver 106 works to filter out hazardous components to plant 104 deriving from organic and inorganic chemicals.

In operation, the porous ceramic member 100 coated with nano silver 106 is mixed with a plant growth medium 102 (e.g., aqueous growth liquid, deionized water, nutrition formula, mineralized water, water with plant fertilizer, MS medium, and woody plant medium) to sterilize the plant growth medium 102. In this manner, a plant root is able to absorb clean, non-toxic plant growth medium 102 (i.e., growth content enriched plant growth medium 102). In some embodiments, the plant growth medium 102 may be placed in a plant containment unit, such as a pot (FIG. 5) or horticultural trays (FIG. 1). The porous ceramic member 100 coated with nano silver 106 is then mixed with the plant growth medium 102 until a desired concentration of the silver nanoparticle is achieved for the desired growth medium filtering effect of enriching the growth medium with growth inducing contents for consumption by the plants. In some embodiments, the desired concentration of the silver nanoparticle is between 20 parts per million (ppm) to 200 ppm where the growth medium is enriched with growth inducing contents such that the plants are healthy without any undesired side effects. For example, the healthy plants are devoid of mold and bacteria and exhibit healthy non-withering stems and leaves.

Those skilled in the art will recognize that microbe (algae, bacteria, mold) contamination and accumulation of growth hindering chemicals pose a serious problem in plant tissue horticulture, and general horticultural activities. Such contaminants pose a critical problem in soils and growth medium 102 commonly used in hydroponic gardens and modern farming configurations, such as vertical farming and plant factory. Thus, the present invention works to: (1) filter out such contaminants with the unique porous ceramic member 100 coated with nano silver 106, (2) without accumulating sludge or slimy contents which can reduce the efficacy by: (3) absorption and filtration of contaminants in the small pores and (4) degradation of contaminants by nano silver catalysis. On the nanoscale, the nano silver 106 has catalytic site such as grooves to which chemical contaminants can attach to. The attached chemical contaminants are in an activated state which can more readily undergo chelation, electron transfer processes, or reaction with water or components of the growth medium 102. In the non-activated state, such reactions are not readily achieved or feasible under such conditions. The nano silver 106 exhibits preference for binding certain chemicals such as heteroatom atom (nitrogen, oxygen, sulfur, arsenic.)-containing organic molecules, which are often growth hindering contents. Note heteroatom containing organic molecules such as triphenylphosphine (($C_6H_5)_3P$) and aniline (($C_6H_5)NH_2$) may contain nitrogen or phosphorous atoms but in are toxic in heteroatom organics to plants and even difficult to obtain nitrogen or phosphorous in nutrient form.) Thus, the nano silver 106 is a selective catalyst for degradation of growth hindering contents. To achieve the same amount of growth of plant 104, less growth time is used in instances of the porous ceramic and the nano silver particles working in combination in comparison to instances of not using the porous ceramic and the nano silver particles working in combination. The frequency of use of and the amount of further treatment methods (e.g., nutritional supplements, bleach sterilization, pesticides, application of ultraviolet light) are reduced or eliminated in instances of the porous ceramic and the nano silver particles working in combination. Instances of not using the porous ceramic and the nano silver particles working in combination often require substantially more frequent use and amount of the treatment methods. Stated another way, the porous ceramic and the nano silver particles work in combination to reduce the amount of nutrition, bleach sterilization, pesticide, and irradiation of the plant growth medium 102 with UV light when growing plants.

As shown in FIG. 1, the porous ceramic member 100 comprises a ceramic member defined by pores. The porous ceramic member 100 may include a stable material, which has high thermal stability and chemical resistance. In one non-limiting embodiment, the porous ceramic member 100 comprises silicon (Si), zirconium oxide ($ZrO_2$), and aluminum oxide ($Al_2O_3$) materials used independently or in combination.

The porous ceramic member 100 is operable as a filter to filter out hazardous materials including organic or inorganic chemicals. The pore size of porous ceramic member 100 may be smaller than 0.50 micrometers and ideally smaller than 0.22 micrometers to successfully filter out microbes and also to enable growth inducing contents, such as nutrient chemical and water, to flow therethrough. In other embodiments, the size of one or more of the pores ranges between 0.20 micrometers to 1.00 micrometer.

In some embodiments, the porous ceramic 100 my include a spherical-shaped member of ceramic defined by pores. The topology of pores, pore size, and the coating on the ceramic can be controlled to achieve different filtering configurations. Thus, by controlling pore size and material coating with ceramic, the porous ceramic member 100 is operable as a molecular sieve to filter out specific hazardous chemical in solution. While the porous ceramic 100 is depicted as being coated with nano silver 106, other metal and nonmetal coatings can be applied to effect plant growth or modify the plant growth medium 102. By coating different metal particles on ceramic, i.e., nano silver 106, the porous ceramic 100 can provide different nutrition to the plant 104 or controlling plant growth. For example, nano particles of the metal magnesium could coat the ceramic, as to release magnesium nutrients to the soil. Certain organic chemicals, such as hydrocarbon chains, may have a stronger affinity for a nonpolar system (e.g., a carbon coating) than a polar system which may result from metal coatings. A nonmetal coating, such as carbon coating, can enhance the filtration of toxic chemicals in the plant growing medium 102.

The porous ceramic material (e.g., porous ceramic 100 and porous ceramic beads 200) has a very large surface area for absorbing aqueous portions of growth medium 102, thereby water makes effective contact with the coating and an enhanced amount of water solution of, for example, divalent magnesium is contained within the pores and subsequently released into plant growth medium 102. Aqueous portions of plant growth medium 102 have a high affinity for certain metals and thus readily contact certain metals such magnesium, especially magnesium coated on the porous ceramic material. Divalent magnesium is soluble in water and is thereby released into aqueous portions of plant growth medium 102. Plant growth medium 102 is enriched with divalent magnesium, which can be absorbed by plant 104. Plant 104 can reside and grow (e.g., germinate, sprout, etc.) within cavity 110. Thus, cavity 110 is the immediate plant growing region within plant containment unit 108, which is a tray in FIG. 1. Cavity 110 can take on different shapes. For example, cavity 110 is a semi-pentagon in Fig. and FIG. 2, a bracket-shape in FIG. 3, and a U-shape in FIG. 4. The shape can impact the amount and efficacy of filtration and absorption of plant growth medium 102 which enriches the growth inducing contents of plant medium 102 to a level in which plant medium 102 is completely non-toxic. Thus, non-toxic plant medium 102, which has an enhanced amount of growth inducing contents of plant medium 102, can be absorbed by plant 104. Modification of the shape impacts the throughput of plant growth medium 102 with an enhanced amount of growth inducing contents.

The topology of pores can be an array of pores, which can modify the throughput of absorbed and filtered plant growth medium 102. There may be a uniform distribution of pores as an array where pores are aligned along most of the perimeter of the semi-polygon shaped version of cavity 110, as depicted in FIG. 1. There may be a non-uniform distribution of pores as an array where there are pores aligned along the entire perimeter of the semi-polygon shaped version of cavity 110, as depicted in FIG. 2. There may be a non-uniform distribution of pores as an array where there are pores aligned along the perimeter of the bracket shaped version of cavity 110, as depicted in FIG. 3. There may be a non-uniform distribution of pores as an array where there are pores aligned along the perimeter of the U-shaped version of cavity 110, as depicted in FIG. 4. The effective surface area for absorption and filtration and directional modes of throughput of filtered plant growth medium 102 are different for the different shapes of cavity 110.

The topology of pores can be a plurality of ceramic beads (e.g., porous ceramic beads 200), wherein the plurality of ceramic beads are coated with nano silver 202, as depicted in FIG. 5. Porous ceramic beads 200 provide increased room for the root system of plant 104 to grow and receive plant growth medium 102, while also allowing for air to enter into the root system of plant 104. Each ceramic bead has the same arrangement of pores, whereby each pore of the porous ceramic with nano silver coating becomes filled with plant growth medium 102. The filtration and degradation of contaminants by the porous ceramic with nano silver coating in FIG. 5 enhances the growth inducing content in growth medium 102 while reducing growth hindering content in growth medium 102. Thus, the absorbed, filtered, and released growth medium 102, which contacts the root system of plant 104, is non-toxic and enhanced in growth inducing content. The non-toxic plant growth medium 102 is a healthier source of nutrients for plant 104 and thus plant 104 grows more efficiency and healthier (e.g., reduced amount of unsightly brown leaves and increased green appearance on a reduced timescale) when using the porous ceramic with nano silver coating than instances of not using the porous ceramic with nano silver coating.

To enhance these filtering capacities, nano silver 106 particles are added/coated on the surface of the porous ceramic member 100. The nano silver may be applied at a concentration of 25 to 500 ppm. And in one non-limiting embodiment, the nano silver 106 is sized at about between 5-40 nanometers. Those skilled in the art will recognize that a nano silver 106 particle has an inherent characteristic that kills microbes.

Consequently, a first combination of a porous ceramic members 100 and nano silver particles 106 and a second combination of porous ceramic bead 200 and nano silver coating 202 are efficacious for filtering out microbes and also preventing microbe growth in non-soil farming systems. Thus, the first combination and the second combination replace traditional gelling reagent (e.g., agar, gelatin, and phytagel), as to enhance the nutrient plant growth medium 102. When the same nutritional formula in the plant growth medium 102 used in instances of a traditional gelling reagent and instances of porous ceramic 100 coated with nano silver 106 particles (or porous ceramic beads 200 coated with nano silver 202), the rate of growth is higher for instances of porous ceramic 100 coated with nano silver 106 particles.

In one exemplary use, the porous ceramic 100 with nano silver 106 particles is utilized in a hydroponic garden system to filter out hazardous materials, including: heavy metal, hazardous bacteria, and toxic chemical; and thereby preventing any microbe contamination. Further, the porous ceramic 100 is effective for stabilizing solution quality including pH, macro and micro nutrition concentration, plant growth hormone concentration. It is also significant to note that the porous ceramic 100 is re-useable and economically viable, which reduces farming costs.

In a method of use, FIG. 1 shows the porous ceramic 100, which is coated with particles of nano silver 106, replacing tradition gel. The porous ceramic 100 is used with a liquid plant growth medium 102. In this manner, the porous ceramic 100 can absorb plant growth medium 102 and release enhanced amounts of plant growth medium with enriched amounts of growth inducing content. This allows the plant 104 to grow more effectively in the growth medium.

Another method of use is shown in FIG. 5, in which the porous ceramic is configured as a plurality of ceramic beads 200 that are coated with particles of nano silver 202 where plant containment 108 is a pot. Each ceramic bead of the plurality of ceramic beads 200 is mixed in the plant growth medium. Thereby, the ceramic beads 200 is used as soil to grow the plant 104. In either method, a nano silver 202, or other metal, can be used to coat the porous ceramic beads 200.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method of growing plants, comprising:
    coating porous ceramic material with nanoparticles, the porous ceramic material having a plurality of pores and one or more cavities, the one or more cavities being enclosed by all sides except a top thereof by the porous ceramic material;
    placing the porous ceramic material coated with nanoparticles into a plant containment unit;
    placing a liquid plant growth medium into the plant containment unit, thereby the plant growth medium contacts an outer surface of the porous ceramic material coated with nanoparticles;
    placing one or more plants into the one or more cavities of the porous ceramic material;
    absorbing the plant growth medium into the pores of the porous ceramic material coated with nanoparticles, thereby causing the plant growth medium to be exposed to the nanoparticles;
    filtering the plant growth medium from the outer surface of the porous ceramic material through the porous ceramic material coated with nanoparticles, thereby removing contaminants from the plant growth medium and enriching the plant growth medium with growth inducing content by exposure to the nanoparticles;
    releasing the plant growth medium, filtered and enriched with the growth inducing content, from the pores into the one or more cavities, thereby contacting root systems of the one or more plants; and
    wherein the nanoparticles comprise silver, magnesium, and carbon.

2. The method of claim 1, wherein the porous ceramic material is constructed of at least one of: silicon (Si), zirconium oxide ($ZrO_2$), and aluminum oxide ($Al_2O_3$).

3. The method of claim 1, wherein the plurality of pores comprises pores each ranging between 0.20 micrometers to 1.00 micrometer.

4. The method of claim 1, wherein filtering the plant growth medium comprises sequestering growth hindering contents from plant growth medium in the pores.

* * * * *